United States Patent [19]

Cochran

[11] 4,260,643
[45] Apr. 7, 1981

[54] TRIGLYCERIDE COMPOSITIONS

[75] Inventor: Walter M. Cochran, Highland Park, Ill.

[73] Assignee: Bunge Edible Oil Corporation, Kankakee, Ill.

[21] Appl. No.: 24,722

[22] Filed: Mar. 28, 1979

[51] Int. Cl.$^3$ .................. A23D 5/00; A23L 1/20; C11C 3/12

[52] U.S. Cl. .................. 426/606; 426/608; 426/633; 260/405.6; 260/409

[58] Field of Search .............. 426/606, 607, 608, 633, 426/313; 260/405.6, 409

[56] References Cited

U.S. PATENT DOCUMENTS

| | | | |
|---|---|---|---|
| 1,755,135 | 4/1930 | Shipner | 260/409 |
| 2,468,799 | 5/1949 | Ziels et al. | 260/409 |
| 2,911,303 | 11/1959 | Rowland et al. | 426/633 |
| 2,972,541 | 2/1961 | Cochran et al. | 426/606 X |
| 2,976,154 | 3/1961 | Brown et al. | 426/633 X |
| 3,856,831 | 12/1974 | Tateishi et al. | 260/409 |
| 3,914,453 | 10/1975 | Gawrilow | 426/553 |
| 3,985,911 | 10/1976 | Kriz et al. | 426/602 |
| 4,045,588 | 8/1977 | Wieske | 426/607 |
| 4,108,879 | 8/1978 | Minowa et al. | 260/409 X |
| 4,134,905 | 1/1979 | Hasman | 260/409 |
| 4,169,843 | 10/1979 | Snyder | 426/607 X |

FOREIGN PATENT DOCUMENTS

1131408 10/1968 United Kingdom .

*Primary Examiner*—Robert A. Yoncoskie
*Attorney, Agent, or Firm*—Lockwood, Dewey, Alex & Cummings

[57] ABSTRACT

Non-fractionated triglyceride compositions characterized by a high ratio of trans mono-unsaturated acid to saturated fatty acids, a high ratio of trans acid to cis acid, and containing from 40–55% saturated fatty acids. These triglycerides exhibit unique structural properties and have utility in the formulation of many fat-based food products such as shortening compositions.

16 Claims, No Drawings

TRIGLYCERIDE COMPOSITIONS

This invention relates to novel triglyceride compositions having utility in the preparation of food products. In particular, this invention relates to non-lauric, non-fractionated triglyceride compositions obtained through hydrogenation of vegetable oils and animal fats.

Edible triglyceride compositions prepared in accordance with prior art hydrogenation techniques fail to simultaneously impart good structural characteristics, good plasticity, and good eating characteristics to lipid-containing food products. It is therefore a primary objective of the present invention to provide improved triglyceride compositions for use in food products.

It is also an object of the present invention to provide an improved process for preparing triglyceride compositions exhibiting unique properties.

It is another object of the present invention to provide triglyceride compositions exhibiting improved structural stability.

It is a further object of the present invention to provide triglyceride compositions that impart improved eating characteristics to food products.

It is an additional object of the present invention to provide triglyceride compositions that impart improved plasticity to food products at refrigeration temperatures.

It is another object of the present invention to provide improved triglyceride compositions that have utility as a stabilizer for peanut butter type products.

It is a further object of the present invention to provide improved shortening compositions.

Briefly, the objectives of this invention are obtained by selectively hydrogenating a starting stock of vegetable oils and/or animal fats. The starting stock may include one or more of the following: cottonseed oil, palm oil, tallow, lard, safflower oil, sunflower oil, corn oil, peanut oil, rapeseed oil, soybean oil and fish/marine oils. However, for most end uses, it is preferred to use cottonseed oil, palm oil, tallow, or mixtures thereof, in view of the strong proclivities exhibited by these oils/fats for forming beta prime crystals.

Often, the starting stock must be subjected to a two-step hydrogenation process. The first step comprises hydrogenating the starting stock under selective conditions of high temperature and low pressure in the presence of a highly active metal catalyst. This step converts most of the polyunsaturated fatty acids (usually linoleic and/or linolenic acids) to monounsaturated acids (usually oleic). This first hydrogenation step must be utilized whenever the starting stock has a saturated fatty acid level of less than about 40% by weight. If the starting stock has a saturated fatty acid content of greater than about 40% by weight, the initial hydrogenation step is not always necessary. Accordingly, whenever the starting stock consists of tallow, lard, palm oil or a mixture thereof, the initial selective hydrogenation may be eliminated, as tallow, lard and palm oil contain greater than 40% saturated fatty acids (stearic and palmitic). However, since palm oil is relatively high in di-unsaturation (about 10% linoleic acid) it can, if desired, first be subjected to an initial hydrogenation to assure conversion of the linoleic acid to oleic acid.

When a first hydrogenation step is required, the objective is to hydrogenate the polyunsaturated fatty acids of the starting stock to oleic acid, while concomitantly increasing the content of saturated fatty acids (usually stearic plus palmitic) to greater than about 40%. The Iodine Value (IV) of the starting stock, prior to hydrogenation, range from 54 to about 180.

The first hydrogenation step is carried out under wellknown conditions of selective hydrogenation. These selective conditions include a relatively low hydrogen pressure of from about 5 to 30 psig. and a relatively high temperature of from about 325° F. to about 460° F. Preferably, the catalyst used is nickel, although other well-known high activity catalysts such a palladium and platinum may also be utilized. This hydrogenation is carried out until essentially all polyunsaturates in the starting stock have been converted to monounsaturates, and total saturated fatty acid content has been increased to greater than about 40%. Also, IV of the starting stock should have been lowered into the range of from about 48 to 56.

When the first hydrogenation step has been completed, if required, the resulting intermediate product is subjected to a second hydrogenation reaction, again carried out under selective conditions of low hydrogen pressure and high reaction temperature. Of course, as has been previously explained, if the starting stock has an initial saturated fatty acid content of greater than about 40% by weight (palm oil, lard or tallow), then the first hydrogenation step is not required. The catalyst utilized in the second hydrogenation step is a relatively inactive sulfurated nickel catalyst. This second selective hydrogenation step simultaneously (a) trans-isomerizes oleic acid to elaidic acid, and (b) maximizes middle melting triglycerides while minimizing high melting and low melting triglycerides.

The hydrogenation temperature during the second step is maintained at from about 340° F.–460° F. Temperatures below about 340° F. are too low to enable trans-isomerization to take place in the presence of the inactive sulfurated catalyst. On the other hand, temperatures above about 460° F. should be avoided inasmuch as the fatty acids tend to undergo polymerization and/or thermal degradation at such high temperatures.

The hydrogen gas pressure in the converter during the second hydrogenation step should be maintained at from about 1–50 psig., and preferably from about 1 to about 30 psig. As will be appreciated by those in the art, the optimum pressure will necessarily be a function of degree of agitation, reaction temperature, purity of the hydrogen gas, and activity of the catalyst. Thus, although it is usually preferable to carry out the second hydrogenation step at a pressure of from 1 to 30 psig., pressures from 30 to 50 psig. can be utilized if the amount of agitation in the converter is maintained very low and/or the reaction temperatures are maintained relatively low (340° F.–400° F.) and/or the hydrogen gas contains appreciable amounts of inert gas impurities and/or the sulfurated nickel catalyst is highly unreactive.

As previously stated, the catalyst which must be used in this second selective hydrogenation step is a relatively unreactive sulfurated nickel catalyst. Conventional nickel, palladium and platinum catalysts cannot be used inasmuch as they are much to reactive, and thus tend to promote hydrogenation of the oleic acid to stearic acid. On the other hand, we have found that highly unreactive catalysts such as nickel subsulfide (see U.S. Pat. No. 3,687,989) are inoperable to produce satisfactory end products for the purposes of this invention.

The most suitable sulfurated nickel catalysts which can be used in carrying out the present invention are best determined through routine laboratory experimentation at a given temperature and pressure, and with a given starting stock. Generally however, the sulfurated nickel catalyst should contain from about 2% to about 6% sulphur, based on the weight of nickel, and preferably from about 4% to about 5% sulphur, based on the weight of nickel. The optimum amount of sulfuration is a function of the indigenous activity of the catalyst, which in turn depends on catalyst particle size and surface area. The sulfurated nickel catalyst may be supported by any of a number of standard catalyst vehicles such as diatomaceous earth, silica, carbon, alumina, asbestos, or kieselghur. Total catalyst, such as sulfurated nickel, suspended in the reaction medium, should be from about 0.1% to about 0.5% by weight.

Nickel catalysts which have been reused several times may be utilized as the sulfurated catalyst described above. Activated nickel catalysts are inactivated during normal hydrogenation procedures due to the presence of traces of sulphur-bearing components in the natural oil and due to impurities often found in hydrogen gas. As the activated nickel catalyst is reused in successive hydrogenation batches, its activity is progressively lowered by surface adsorption of the sulphur. The sulphur decreases the activity of the nickel catalyst in direct proportion to the amount of sulphur adsorbed. As discussed above, inactivated catalysts selected for use in the present invention should contain from 2–6%, and preferably about 4–5% adsorbed sulphur by weight, based on the weight of nickel.

A sulfurated catalyst suitable for use in the present invention may be specially prepared by intentionally "doping" a catalyst with sulphur. For example, a solution of sulphur and vegetable oil can be prepared by heating and mixing a small quantity of elemental sulphur with a vegetable oil. Thereafter, the sulfurated oil may be blended with a pure vegetable oil, and then a charge of activated nickel catalyst added thereto. By hydrogenating this mixture, the activated nickel catalyst will be inactivated by the sulphur in the sulfurated oil. The hydrogenated mixture is then filtered to yield a filter cake comprising filter aid material, hydrogenated oil and sulfurated nickel. This sulfurated nickel containing filter cake may then be utilized as the catalyst in the present invention. Clearly, the parameters of this "doping" technique should be controlled so as to yield a sulfurated nickel containing the desired quantity of sulphur.

As previously mentioned, the second hydrogenation step of this invention acts to trans-isomerize cis-monounsaturated acids to trans monounsaturated acids. Generally this involves trans-isomerizing oleic acid to elaidic acid. The melting point of elaidic acid is 111° F. whereas the melting point of oleic acid is 61° F. Thus by increasing the ratio of elaidic to oleic through trans-isomerization, the melting curve of the final product can be dramatically altered. The parameters of low pressure, high temperature, and inactive sulfurated catalyst imparts the ability to trans-isomerize oleic acid to elaidic acid. Apparently, the sulfurated nickel catalyst is so inactive as to resist hydrogenation of oleic acid double bonds adsorbed on the catalyst surface. Rather, once the oleic acid double bonds are adsorbed by the catalyst, they will ultimately desorb from the catalyst, forming either the cis or trans-isomer upon desorption. Hydrogenation is continued until the hydrogenated stock exhibits an IV of from about 43 to 52.

The triglyceride composition obtained persuant to the two-step (or one-step) hydrogenation process described above is a non-fractionated, partially hydrogenated triglyceride of unique properties and characteristics. The final triglyceride profile will, of course, depend upon both the nature of the starting stock and the exact parameters of hydrogenation. Obviously, one skilled in the fats/oils art will select a starting stock and hydrogenation parameters, within the above guidelines, so as to provide a final glyceride profile suitable for the intended end purpose of the triglyceride composition.

The triglyceride composition of this invention will possess a Wiley melting point range of from about 114° F. to 127° F. As mentioned, the triglyceride compositions will have an Iodine Value of from 43 to 52. Typically, the triglyceride compositions of this invention will exhibit a Solids Fat Index (SFI) falling within the following range:

| Temperature/°F. | SFI |
| --- | --- |
| 50 | 65.2–76.2 |
| 70 | 57.2–76.8 |
| 80 | 53.0–76.9 |
| 92 | 43.9–72.0 |
| 104 | 27.3–54.0 |

The triglyceride composition will contain, by weight, 40–55% saturated fatty acids, and preferably from about 45–53% saturated fatty acids. The total amount, by weight, of trisaturated glycerides will be from about 5 to 20%, and preferably from about 7 to 15%. Total trans acid content will be from about 30–40%, while total cis acid will be from about 14–20% by weight. Total amount of liquid oils at room temperature (72° F.) is extremely low, usually less than 10% by weight.

The ratio of trans acid (elaidic) to cis acid (oleic) is extremely high, falling within the range of from about 1.9–2.75 to 1.0. Moreover, the weight ratio of trans acid (elaidic) to total saturated fatty acids is very high, ranging from 0.5–1.0 to 1.0, or above. The present triglyceride compositions are quite unique and surprising in that they simultaneously exhibit a ratio of elaidic to oleic of 1.9–2.75 to 1.0, and a ratio of elaidic to saturated fatty acids of 0.5–1.0 to 1.0. Prior art hydrogenated triglyceride compositions are characterized by much lower ratios of elaidic/saturated fatty acids and trans acids/cis acids. The present triglyceride compositions are also unique in that they are characterized by a low total oil content (less than 10%), low total trisaturated glyceride content (less than about 15%), while containing 75–85% middle melting range triglycerides (Wiley melting points ranging from 70°–130° F.). An ideal triglyceride composition obtained by this invention will contain about 85% middle range triglycerides, about 10% trisaturated glycerides, and about 5% liquid oils.

The triglyceride compositions of this invention exhibit some rather unusual characteristics. For example, these triglyceride compositions exhibit strong tendencies to form tiny, tightly knit, stable crystals, predominantly beta prime, immediately upon seeding out of solution. It is believed that my process is operable to take oils that normally tend to form beta crystals upon solidification, and convert such oils into triglyceride components that tend to predominantly form beta prime crystal structures. That is, normally beta forming triglycerides are converted into triglycerides exhibiting less beta forming tendencies.

It should be noted that the present process for forming novel triglyceride compositions is different than prior art processes for hydrogenating fats and oils in the preparation of hardbutters. In particular, I have found it necessary to pre-set the total saturated fatty acids content, either by starting stock selection or by an initial hydrogenation step in the presence of an active catalyst, to a level of greater than 40% by weight prior to trans-isomerization. It would not be possible to further hydrogenate such a triglyceride (greater than 40% saturates) to a suitable hardbutter, as the final product would contain an unacceptable level of saturates at eating temperature (98.6° F.), and thus be inedible.

Probably the most dramatic utility of these triglyceride compositions is in the manufacture of shortenings. Typically, shortening compositions are prepared by blending non-hydrogenated or partially hydrogenated vegetable oils and/or non-hydrogenated or partially hydrogenated animal fats. Typical animal fats include lard, tallow and mutton fat. Typical vegetable oils include corn, cottonseed, coconut, olive, palm, palm kernel, peanut, soybean, safflower and sunflower. All of these ingredients, whether non-hydrogenated or slightly hydrogenated, represent candidate fats/oils from which shortening compositions may be prepared. Those skilled in the fat/oil art are aware that, depending on the desired end use of the particular shortening, fats and/or oils will be blended to give desired "hardness", plasticity, lubricity, eating characteristics, crystal structure, Solid Fat Index profile, etc., in the final shortening composition. Shortenings sometimes will contain an aqueous phase, constituting up to 20% of the total weight.

I have surprisingly discovered that by using the novel triglyceride compositions of this invention, in amounts of up to 15-40% of the total shortening fat phase, in combination with from about 60-85% of typical shortening fats and oils described above, unique shortening compositions can be obtained. In particular, these novel triglyceride compositions enable the preparation of shortenings characterized by (1) dramatically flat SFI profiles over the temperature range of 40°-70° F., (2) good eating characteristics and (3) excellent structural characteristics over the temperature range of 40°-90° F.

It should be noted that the above discussion with respect to "shortening" compositions is equally applicable to industrial margarine compositions which usually contain a somewhat larger % aqueous phase than do shortenings, but like shortenings, are used extensively in the manufacture of various baked goods.

EXAMPLE 1

To a 20 gallon stirred reactor was added 117 lbs. of tallow having an Iodine Value of 48.5 along with 800 grams of an inactive sulfurated nickel catalyst containing 15% nickel by weight. The charge was heated to 380° F. in a nitrogen atmosphere. Nitrogen was then evacuated, and the tallow was hydrogenated for 2 hours at 5 psig and 388°-392° F. Thereafter, the tallow was hydrogenated for 2 additional hours at a hydrogen pressure of 25 psig and a temperature of 387°-390° F.

The Iodine Value of the partially hydrogenated triglyceride composition was 45.4, and the Wiley melting point of the filtered and deodorized product was 116.6° F. (47° C.). The triglyceride composition had the following SFI profile:

| Temperature/°F. | SFI |
| --- | --- |
| 50 | 73.8 |
| 70 | 71.2 |
| 80 | 70.3 |
| 92 | 57.5 |
| 104 | 31.4 |

Total elaidic acid content was 35.8%, total oleic acid content was 13.0%, and total saturated fatty acids were 46.0%, as determined by well-known analytical methods of gas liquid chromatography and infrared spectrophotometry.

EXAMPLE 2

To a 20 gallon stirred reactor was added 114 lbs. refined/bleached cottonseed oil having an IV of 110, along with 62 grams of active nickel catalyst having a nickel content of 25% by weight. The batch was heated to 380° F., then hydrogenated under a hydrogen pressure of 5 psig and a temperature of 380°-455° F. to an Iodine Value of 45.4. The active nickel catalyst was then filtered out and 109 lbs. of the partially hydrogenated oil recharged to the reactor, along with 800 grams inactive sulfurated nickel catalyst (15% nickel by weight). The oil was heated to 380° F., further hydrogenated at 5-7 psig and 380°-387° F. for 2½ hours, then hydrogenated at 25 psig and 380°-381° F. for about 2 more hours.

The triglyceride composition exhibited a final IV of 43.9 and a Wiley melting point of 124.7° F. (51.5° C.). The product had a SFI profile as follows:

| Temperature/°F. | SFI |
| --- | --- |
| 50 | 75.3 |
| 70 | 75.2 |
| 80 | 75.0 |
| 92 | 69.9 |
| 104 | 52.8 |

Total elaidic acid content was 37.3% by weight, total oleic acid was 13.6%, and total saturated fatty acids were 48.7%.

Pie Crust Shortenings

Commercially, pie crusts are manufactured by fabricating a dough from flour and a fat, usually lard. Lard is far superior to state of the art shortening compositions in the manufacture of pie crusts due to lard's optimum plastic structure at temperatures of 30°-50° F. In order to obtain a properly fabricated dough it is necessary that the flour and the fat be blended and mixed at low temperatures, generally 30°-50° F. It is, of course, possible to formulate vegetable oil shortening compositions that have a requisite plasticity at 30°-50° F. However, in order to provide such plasticity, it is usually necessary to formulate high levels (10-15%) of fully saturated triglycerides (flake) in the vegetable oil. Although the shortening would then have appropriate plasticity at 30°-50° F., it would not provide optimum structure at room temperature, nor would it provide suitable eating characteristics.

I have surprisingly discovered that an ideal pie crust shortening can be formulated by blending the present novel triglyceride compositions with typical shortening stock fats and oils. Generally, the novel triglyceride compositions, in amounts of from about 20-40% by weight, are blended with 60–80% by weight of shortening stock fats and oils, such as soybean oil, corn oil, cottonseed oil, tallow, etc. A shortening composition so formulated exhibits an excellent plastic structure at 30°–50° F. as well as good eating characteristics. It is believed that the excellent plastic properties at low temperatures are a function of the uniquely flat solids profile from 40°–80° F. and the extremely small, stable beta prime crystals provided by the novel triglyceride compositions.

EXAMPLE 3

A comparison test was carried out between (a) a commercially available lard commonly used in the manufacture of pie crusts, (b) a commercially available all-purpose, partially hydrogenated vegetable shortening, and (c) a vegetable shortening made with the novel triglyceride compositions of this invention.

The lard composition was a blend of lard and partially hydrogenated lard, along with BHA and BHT antioxidants. The commercial vegetable shortening was a blend of partially hydrogenated soybean oil and partially hydrogenated palm oil. The novel vegetable shortening was prepared by combining the following:

| | |
|---|---|
| Soybean oil | 52.0% by weight |
| Partially hydrogenated palm oil | 36.0% by weight |
| Palm oil flake | 2.0% by weight |

30,000 lbs. of the partially hydrogenated palm oil was prepared in accordance with this invention by subjecting palm oil to a first selective hydrogenation in the presence of an active nickel catalyst at a temperature of 330°–340° F. for 2½ hours at 25 psig, then subjecting the product of this first hydrogenation to a second hydrogenation in the presence of a sulfurated nickel catalyst at 332°–340° F. for 2½ hours at 25–30 psig. The final product of the twostep hydrogenation had a Wiley melting point of 114.3° F., and a SFI profile as follows:

| Temperature/°F. | SFI |
|---|---|
| 50 | 70.5 |
| 70 | 64.6 |
| 80 | 61.5 |
| 92 | 49.8 |
| 104 | 29.6 |

When combined with the soybean oil and palm flake in the proportions above, the novel pie crust shortening of this invention had a Wiley melting point of 106.3°, and IV of 97.1 and a SFI profile, after bleaching and deodorizing, as follows:

| Temperature/°F. | SFI |
|---|---|
| 50 | 23.2 |
| 70 | 20.0 |
| 80 | 17.6 |
| 92 | 12.5 |
| 104 | 4.4 |

The lard, the commercial shortening, and the new shortening were then used to prepare pie crust doughs in a commercial mixer in accordance with the following formula and procedure:

| Ingredients | Weight % Basis Total Flour | Procedure |
|---|---|---|
| Pastry Flour | 50 | Mix 3 minutes |
| Lard or shortening | 60 | |
| Pastry Flour | 50 | Mix 1 minute |
| Water (with ice) | 25 | Mix 40 second |
| Dextrose | 2 | |
| Salt | 8 | |

Each dough was then held at room temperature for 30 minutes and scaled into appropriate pieces to make 8-ounce pie shells in 8-inch pans. The pie crusts were then baked at 400° F. for 15 minutes, and evaluated as follows:

| | Dough Handling | Flakiness | Tenderness |
|---|---|---|---|
| Lard | Slightly soft - not sticky - no tearing | Very flaky | Slightly fragile |
| Commercial Shortening | Very dry - some tearing | Flaky | Slightly tough - some holes |
| New Shortening | Slightly dry - no tearing | Very flaky | Not fragile - tender |

It was concluded that pie crusts made with the new shortening composition compared very favorably with crusts made from lard, and were far superior to crusts made from a commercially available shortening.

Self-Plasticizing Shortening

Almost all commercial shortening compositions have a solid, plastic physical form, and are sold in boxes. This is because the structural functionality of shortening is exhibited only when the shortening has been carefully cooled to insure the formation of proper crystal structure. Thus, shortenings are generally always manufactured by votating, under critical temperature conditions, a base stock consisting of partially hydrogenated triglycerides. The resulting plastic shortening composition will exhibit the required crystal structure. However, if the plastic shortening is melted and allowed to cool back to its plastic form, this functionality will be lost.

A self-plasticizing shortening, on the other hand, is a shortening that will automatically develop the structural characteristics of a conventional votated type shortening regardless of how it is cooled to its plastic form from the molten state. I have surprisingly discovered that the present novel triglyceride compositions may be used to formulate a general purpose, self-plasticizing shortening. For example, by combining about 20–35% by weight of the present triglyceride compositions with from about 65–80% of typical shortening stock, a self-plasticizing shortening composition is formed. The shortening stock may include non-hydrogenated or slightly hydrogenated lard, tallow, vegetable oils, and mixtures thereof. The precise blend of shortening stock and novel triglyceride compositions will depend upon the nature of the shortening stock component. Thus, if the shortening stock is tallow, which inherently possesses a relatively high weight percent of fully saturated triglycerides, then the amount of novel triglyceride compositions which must be added will be relatively low, e.g., about 20%. On the other hand, if the shortening stock is a vegetable oil, being inherently low in fully saturated triglycerides, then the amount of novel triglyceride compositions which must be added to obtain a self-plasticizing shortening will be relatively high, e.g., 35%.

Such self-plasticizing shortenings have utility in the food processing industry as general purpose shortenings for the manufacture of bakery products such as cakes, cookies, icings, and cream fillers. Since the shortening composition is self-plasticizing, it may be utilized in its molten state. Accordingly, the shortening has much greater versatility than typical plastic shortening compositions which cannot be melted prior to their use in bakery operations.

EXAMPLE 4

A self-plasticizing shortening composition was prepared by combining the following:

| Ingredient | Weight % |
| --- | --- |
| Tallow | 77.5 |
| Partially hydrogenated tallow prepared in accordance with this invention | 20.0 |
| 90% monoglyceride emulsifier | 2.0 |
| Polysorbate emulsifier | 0.5 |
| | 100.0 |

The partially hydrogenated tallow composition prepared in accordance with this invention had a Wiley melting point of 115° F. and an SFI profile as follows: 72 at 50° F., 70 at 70° F., 69 at 80° F., 58 at 92° F. and 31 at 104° F.

The self-plasticizing shortening composition had a Wiley melting point of 115° F. and exhibited a SFI profile as follows:

| Temperature/°F. | SFI |
| --- | --- |
| 50 | 40.4 |
| 70 | 30.2 |
| 80 | 27.5 |
| 92 | 20.0 |
| 104 | 9.1 |

This self-plasticizing shortening was compared with a commercially available animal fat/vegetable oil shortening containing monoglycerides, diglycerides and polysorbate emulsifiers. The commercial shortening was specifically formulated as a cake and icing shortening and possessed a SFI profile as follows: 29 at 50° F., 25 at 70° F., 22 at 80° F., 20 at 92° F. and 14 at 104° F.

A cream filler was made with each shortening composition in accordance with the following formula and procedure:

| Ingredient | Weight % | Procedure |
| --- | --- | --- |
| Powdered sugar | 54 | |
| Shortening* | 25 | Add to sugar |
| Non-fat dry milk | 3 | |
| Water, salt, vanilla | 4 | Slurry and add to above |
| Water** | 14 | Add gradually, then mix for 20 minutes |
| | 100.0 | |

*Prior art shortening was added as a plastic at 72° F. whereas new shortening was added molten at 120° F.
**Water with crushed ice was added to new shortening formulation.

The two cream fillers were evaluated as follows:

| | Prior Art Shortening | Self-Plasticizing Shortening |
| --- | --- | --- |
| Specific Gravity | .560 | .545 |
| Trench Stability | Infinite | Infinite |
| Syneresis | None | None |
| Air Cell Coalescence (24-Hour) | None | None |

It was concluded that the self-plasticizing shortening resulting in a lighter, less dense cream filler.

EXAMPLE 5

The self-plasticizing shortening of Example 4 was next compared with the prior art shortening of Example 4 in the preparation of high-sugar, white layer cakes. The cakes were prepared in accordance with the following formula, all ingredients being first tempered at 75° F.:

| Ingredient | Weight |
| --- | --- |
| Cake flour | 2 lbs. 8 oz. |
| Fine granulated sugar | 3 lbs. 8 oz. |
| Shortening* | 1 lbs. 7 oz. |
| Baking powder | 2½ oz. |
| Salt | 1½ oz. |
| Non-Fat milk solids | 4 oz. |
| Water* | 2 lbs. 2 oz. |
| Egg Whites | 1 lb. 11 oz. |
| Vanilla | ¾ oz. |
| Whole eggs | 3 oz. |

*Prior art shortening was added as a plastic at 72° F. whereas now shortening was added molten at 120° F.
**Water with crushed ice was added to new shortening formulation.

Flour, sugar, shortening, baking powder, salt, non-fat milk solids and all but 12 oz. of the water were mixed together for 6 minutes. One-half of the remaining water, egg whites, vanilla and whole eggs were added and mixing resumed for 1½ minutes. Finally, the remaining ingredients were added with additional mixing for 2½ minutes. The following data was determined.

| | Prior Art Shortening | Self-Plasticizing Shortening |
| --- | --- | --- |
| Batter Specific Gravity | .970 | .985 |
| Cake Volume | 1150 cc. | 1215 cc. |
| Cake Weight | 3½ in. | 2¾ in. |
| Grain | Even | Slightly coarse |

Peanut Butter Stabilizer

Most commercial peanut butter products are stabilized with either (a) fully saturated triglycerides (flake), e.g., palmitates or stearates, or (b) a combination of fully saturated triglycerides and a partially hydrogenated triglyceride, e.g., hardened cottonseed oil. In view of the high melting point, and consequential inedibility, of the fully saturated triglycerides used to stabilize peanut butter, commercial peanut butters are not fully acceptable with respect to eating characteristics. That is, the peanut butter stabilizer tends to impart a waxy feel to the mouth.

I have surprisingly discovered that the novel triglyceride compositions of this invention function as excellent stabilizers for peanut butter, either when used alone or in combination with small amounts of fully saturated triglycerides. In either case, the weight percent of trisaturates can be significantly decreased over state of the art peanut butter stabilizer compositions. Accordingly, use of the present triglyceride compositions enables the manufacture of peanut butters having improved eating and mouth melting characteristics. Generally, the stabilizer triglycerides of this invention have Wiley melting points of less than about 127° F., in contrast to fully saturated prior art triglyceride stabilizers that exhibit melting points of from 130° F. to 150° F.

A particularly surprising utility of these triglyceride compositions is as stabilizers for whipped peanut butter. Whipped peanut butter (see U.S. Pat. No. 2,976,154) is a peanut butter that has had an inert gas, such as nitrogen, incorporated therein to give a less dense, better-eating peanut butter product. The volume of the product may be increased up to 30% or more in this manner. Unfortunately, commercialization of such a product has failed because state of the art stabilizer compositions are too rigid structurally to stabilize a whipped peanut butter. Accordingly, such products tend to crack, collapse and pull away from the jar upon standing. Due to the improved structural properties of the present triglyceride composition stabilizer, it can stabilize whipped peanut butters over an extended shelf-life without the peanut butter cracking or pulling away from the jar.

EXAMPLE 6

30,000 lbs. of cottonseed oil were subjected to a two-step hydrogenation procedure along the guidelines of Example 2. The final partially hydrogenated product had a Wiley melting point of 122° F., and IV of 47.6 and a SFI profile as follows:

| Temperature/°F. | SFI |
|---|---|
| 50 | 75.2 |
| 70 | 72.7 |
| 80 | 70.9 |
| 92 | 60.8 |
| 104 | 40.6 |

A peanut butter stabilizer composition was then formulated as follows:

| Ingredient | Weight % |
|---|---|
| Partially hydrogenated cottonseed oil from above | 77.33 |
| Palm oil flakes | 16.67 |
| Cottonseed oil flakes | 6.00 |
| | 100.00 |

This stabilizer had a Wiley melting point of 127.2°, an IV of 38.8 and a SFI profile as follows:

| Temperature/°F. | SFI |
|---|---|
| 50 | 73.9 |
| 70 | 74.3 |
| 80 | 74.6 |
| 92 | 70.4 |
| 104 | 56.6 |

This stabilizer composition was added at a level of 2.0% by weight to a whipped peanut butter product prepared by incorporating 25% nitrogen, by volume, in a peanut butter emulsion prepared from about 90% ground roasted peanuts, along with sugar and salt. Shelf-life tests, shipping tests and taste tests demonstrated that the stabilizer composition performed exceptionally well.

Pastry Shortenings/Industrial Margarines

Another food application for the novel triglyceride compositions of this invention is in the formulation of pastry shortenings/industrial margarines, also called roll-in shortenings, and including puff pastry shortening and danish pastry shortenings.

Roll-in pastries, such as puff pastry (sometimes referred to as French pastry) and Danish pastry, are made from a laminated dough sheet consisting of many very thin alternate layers of shortening and dough. The preparation of puff pastry and Danish pastry is similar insofar as layers of fat are interleaved between layers of dough, so that upon baking a separation of dough strata occurs. Puff pastry ingredients usually include no leavening, but, in spite of this, puff pastry baked products have an open network of crisp and flaky layers. In Danish pastry, however, yeast leavening and auxiliary ingredients produce a baked product having a soft and porous structure in the dough layers.

The rheological characteristics of the shortening used in the preparation of puff pastry is quite critical because the desired puff pastry product is a treated flaky base product with definite separation of the dough layers. The puff pastry itself contains flour, shortening, salt and water. Shortening is used in the dough itself and as a roll-in additive between the layers of dough. The preparation of the puff pastry itself involves three basic steps: preparation of the dough, incorporation of the roll-in fat and the folding and sheeting operation. The dough preparation and folding and sheeting steps develop the gluten in the flour.

These procedures are designed to optimize the gluten development for maximum expansion upon baking. During the folding and sheeting operations which are usually conducted at room temperature, the puff pastry shortening must be plastic and tough so as to spread into a thin, uniform film between the layers of dough without either soaking into the dough or tearing the dough. Furthermore, the finished puff pastry product must have good "mouth feel", so the shortening should have a rather sharp melting characteristic in the vicinity of body temperature.

Puff pastry shortening must be capable of being spread into uniform layers when compressed between layers of dough. This requirement means that the dough should have certain toughness or elastic stress-strain characteristics within the normal room temperatures encountered. Storage of pastry shortening may be in the range of 40° to 90° F. while the temperature of actual use is about 70° to 75° F. If the pastry shortening is too firm or too hard when used, it will tear holes in the dough and cause discontinuities when the dough is folded. If the shortening is too soft, the shortening has a tendency to "oil out" or soak into the dough rather than remaining as a distinct layer between the two layers of dough. Since shortening is used directly from storage, the shortening should have a wide temperature range of usefulness.

In other words, the shortening should possess ideally the unique combination of properties wherein it is tough yet plastic over a wide temperature range of 40° to 90° F. while maintaining its structure and consistency when worked repeatedly and produce a light flaky pastry upon baking. In the baking arts, this is referred to as a "functionality", so the shortening should be "functional" over the temperature range of 40° to 90° F. Furthermore, the shortening should have a low enough melting point to provide a good mouth feel to the finished baked product rather than the waxiness or greasy mouth feel associated with the high-melting fats.

Prior art roll-in shortening and industrial margarine compositions tend to represent a trade-off between functionality and eating characteristics. This is because saturated glyceride components that are required in major amounts to provide functionality, such as machinability, result in poor eating characteristics of the pastry product, due to the waxy mouth feel left by fully saturated triglycerides. On the other hand, if the pastry shortening is formulated to provide outstanding eating characteristics (relative absence of trisaturated glycerides at body temperature), then the shortening necessarily sacrifices functionality and structural properties over the temperature range of 40°–90° F.

I have surprisingly discovered that use of the novel triglyceride compositions of this invention enables the formulation of pastry shortenings characterized by excellent plasticity at refrigeration and ambient temperatures, excellent eating characteristics, and excellent structural properties at temperatures of up to about 90° F. In particular, the improved shortenings are formulated by blending nonhydrogenated or slightly hydrogenated vegetable oils and/or animal fats with the above-described novel triglyceride compositions. Generally, the novel triglyceride compositions will be present in amounts of from about 15–40% by weight of total triglycerides. Due to the excellent beta prime crystal characteristics and unique solids profile from 40°–80° F. of these novel triglyceride compositions, it is not necessary to add saturated triglyceride flake to the pastry shortening composition. It is, of course, possible to add small amounts of flake if desired; but such flake would be added in lower quantities than state of the art pastry shortening compositions.

EXAMPLE 7

The fat phase of an industrial margarine was prepared by combining 73% by weight hydrogenated soybean oil of 102 IV, 2% palm oil flake and 25% partially hydrogenated tallow triglycerides prepared in a manner similar to Example 1. The hydrogenated tallow triglycerides had a Wiley melting point of 115° F., an IV of 45.1 and a SFI profile as follows: 70.8 at 50° F., 67.9 at 70° F., 66.1 at 80° F., 54.2 at 92° F. and 28.5 at 104° F.

This fat phase was then emulsified with an aqueous phase containing salt and flavor to provide an industrial margarine of 80% fat phase and 20% aqueous phase. The industrial margarine had a Wiley melting point of 100° F. and a SFI profile as follows:

| Temperature/°F. | SFI |
|---|---|
| 40 | 25.0* |
| 50 | 23.5 |
| 70 | 18.2 |
| 80 | 16.5 |
| 92 | 10.7 |
| 104 | 6.6 |

*extrapolated

This industrial margarine was then compared with a typical prior art industrial margarine (80% fat phase, 20% aqueous phase) prepared from partially hydrogenated soybean and cottonseed oils, and having a SFI profile as follows:

| Temperature/°F. | SFI |
|---|---|
| 40 | 30.5* |
| 50 | 27 |
| 70 | 16 |
| 80 | 13 |
| 92 | 7 |
| 104 | 3.5 |

*extrapolated

In accordance with accepted prior art procedures, the prior art margarine was chilled and work-softened through votators, packaged and tempered at 80° F. for 48 hours, then stored at 40° F. On the other hand, the new industrial margarine was merely chilled, packaged and stored at 40° F. (no work-softening through votators or tempering over long periods at 80° F.). The consistency of each margarine was then measured with a consistometer. The prior art margarine recorded a consistency of 113 units compared to 89 units for the new margarine product, indicating a significantly greater plasticity (spreadability) of the new product, even in the absence of work-softening and tempering.

A comparative storage test was conducted at 85° F. for 72 hours. The prior art margarine exhibited significant syneresis (oiling-off), whereas the new margarine failed to exhibit any syneresis. Finally, the new margarine composition was used to make cookies. After baking, sensory evaluation tests demonstrated that the new industrial margarine product resulted in cookies having good eating characteristics.

Unless otherwise stated, all percentages herein are expressed as weight percent. SFI, as used throughout, refers to Solid Fat Index, and constitutes and represents an empirical measure of the solid fat content of a triglyceride system as calculated from specific volume at given temperatures. See American Oil Chemists Society (A.O.C.S.) Tentative Method Cd 10-57.

Obviously many modifications and variations of the invention as hereinbefore set forth may be made without departing from the spirit and scope thereof, and, therefore, only such limitations should be imposed as are indicated in the appended claims.

I claim:

1. An edible non-fractionated, triglyceride composition containing by weight 40–55% saturated fatty acids, 5–20% trisaturated glycerides, 30–40% trans acid, 14–20% cis acid, and exhibiting a Wiley melting point of from 114°–127° F., an Iodine Value of from 43–52, and a Solid Fat Index as follows: 65.2–76.2 at 50° F., 57.2–76.8 at 79° F., 53.0–76.9 at 80° F., 43.9–72.0 at 92° F. and 27.3–54.0 at 104° F.

2. The triglyceride composition of claim 1 wherein it contains 45–53% saturated fatty acids, 7–15% trisaturated glycerides and less than 10% liquid oils at 72° F.

3. The triglyceride composition of claim 1 wherein the weight-to-weight ratio of trans acid to cis acid is from about 1.9–2.75 to 1.0.

4. The triglyceride composition of claim 1 wherein the weight-to-weight ratio of trans acid to total saturated fatty acids is at least 0.5–1.0 to 1.0.

5. A process for preparing edible non-fractionated triglyceride compositions comprising subjecting a starting stock selected from the group consisting of cottonseed oil, palm oil, safflower oil, sunflower oil, corn oil, peanut oil, rapeseed oil, soybean oil, fish oils, marine oils and mixtures thereof to a first hydrogenation step in the presence of an active metal catalyst under selective conditions of low hydrogen pressure and high temperature until said starting stock exhibits an Iodine Value of from about 48–56 and contains greater than 40% saturated fatty acids by weight; and thereafter subjecting the triglyceride compositions obtained from said first selective hydrogenation to a second hydrogenation carried out in the presence of a sulfurated nickel catalyst and at a temperature of from about 340°–460° F. and under a hydrogen pressure of from about 1–50 psig, and continuing said second hydrogenation until said partially hydrogenated triglyceride composition contains 40–55% saturated fatty acids, 5–20% trisaturated glycerides, 30–40% trans acid, 14–20% cis acid, and exhibits a Wiley melting point of from 114°–127° F., an Iodine Value of from 43–52 and are characterized by a Solid Fat Index as follows: 65.2–76.2 at 50° F., 57.2–76.8 at 70° F., 53.0–76.9 at 80° F., 43.9–72.0 at 92° F. and 27.3–54.0 at 104° F.

6. The process of claim 5 wherein the starting stock is cottonseed oil.

7. The process of claim 5 wherein the first selective hydrogenation step is carried out at a hydrogen pressure of from about 5 to 30 psig and at a temperature of from about 350°–460° F.

8. The process of claim 5 wherein the second selective hydrogenation step is carried out at a hydrogen pressure of from about 1 to 30 psig.

9. The process of claim 5 wherein the sulfurated nickel catalyst contains from about 2–6% sulphur based on the weight of nickel.

10. A process for preparing edible non-fractionated triglyceride compositions comprising subjecting a starting stock selected from the group consisting of palm oil, tallow, lard and mixtures thereof to selective hydrogenation in the presence of a sulfurated nickel catalyst at a temperature of from about 340°–460° F. and under a hydrogen gas pressure of from about 1–50 psig, and continuing said hydrogenation until said triglycerides contain 40–55% saturated fatty acids, 5–20% trisaturated glycerides, 30–40% trans acid, 14–20% cis acid, and exhibit a Wiley melting point of from 114°–127° F., an Iodine Value of from 43–52, and are characterized by a Solid Fat Index as follows: 65.2–76.2 at 50° F., 57.2–76.8 at 70° F., 53.0–76.9 at 80° F., 43.9–72.0 at 92° F. and 27.3–54.0 at 104° F.

11. The process of claim 10 wherein hydrogenation is carried out until the triglyceride composition contains 45–53% saturated fatty acids, 7–15% trisaturated glycerides and less than 10% liquid oils at 72° F.

12. The process of claim 10 wherein the weight-to-weight ratio of trans acid to cis acid is from about 1.9–2.75 to 1.0.

13. The process of claim 9 wherein the weight-to-weight ratio of trans acid to saturated fatty acids is at least 0.5–1.0 to 1.0.

14. An improved shortening or margarine composition wherein the fat phase comprises from about 60–85% by weight of shortening stock selected from the group consisting of non-hydrogenated or slightly hydrogenated vegetable oils, animal fats and mixtures thereof, and from about 15–40% by weight of a non-fractionated triglyceride composition containing 40–55% saturated fatty acids, 5–20% trisaturated glycerides, 30–40% trans acid, 14–20% cis acid, and exhibiting a Wiley melting point of from 114°–127° F., an Iodine Value of from 43–52, and a Solid Fat Index as follows: 65.2–76.2 at 50° F., 57.2–76.8 at 79° F., 53.0–76.9 at 80° F., 43.9–72.0 at 92° F. and 27.3–54.0 at 104° F.

15. A peanut butter composition comprising ground roasted peanuts, wherein the peanut butter is stabilized by the presence of from 1–6% by weight of the total composition of a non-fractionated triglyceride composition containing by weight 40–55% saturated fatty acids, 5–20% trisaturated glycerides, 30–40% trans acid, 14–20% cis acid, and exhibiting a Wiley melting point of from 114°–127° F., an Iodine Value of from 43–52, and a Solid Fat Index as follows: 65.2–76.2 at 50° F., 57.2–76.8 at 79° F., 53.0–76.9 at 80° F., 43.9–72.0 at 92° F. and 27.3–54.0 at 104° F.

16. The peanut butter composition of claim 15 wherein the peanut butter has been volume extended by the incorporation of nitrogen gas.

* * * * *

UNITED STATES PATENT AND TRADEMARK OFFICE
CERTIFICATE OF CORRECTION

PATENT NO. : 4,260,643
DATED : April 7, 1981
INVENTOR(S) : Walter M. Cochran

It is certified that error appears in the above-identified patent and that said Letters Patent are hereby corrected as shown below:

Column 2, line 63, "to" should read --too--.

Column 6, line 28, "2-1/2 hours" should read --2-1/4 hours--.

Column 7, line 28, "52.0% by weight" should read --62.0% by weight--.

Column 8, line 9, "Salt  8" should read --Salt  3--.

Column 10, line 25, "1 lbs. 7 oz." should read --1 lb. 7 oz.--.

Column 10, line 28, "Water*" should read --Water**--.

Column 10, line 31, "now" should read --new--.

Column 10, line 48, "Cake Weight" should read --Cake Height--.

Column 10, line 48, "2-3/4 in." should read --3-3/4 in.--.

Column 13, line 26, "slighly" should read --slightly--.

Signed and Sealed this

First Day of September 1981

[SEAL]

Attest:

GERALD J. MOSSINGHOFF

Attesting Officer   Commissioner of Patents and Trademarks